(12) United States Patent
Rinko

(10) Patent No.: US 10,801,694 B2
(45) Date of Patent: Oct. 13, 2020

(54) LENS HAVING MUTUALLY DIFFERENT OPTICAL SEGMENTS

(71) Applicant: Oy MTG-Meltron LTD, Helsinki (FI)

(72) Inventor: Kari Rinko, Helsinki (FI)

(73) Assignee: Oy MTG-Meltron LTD, Helsinki (FI)

( * ) Notice: Subject to any disclaimer, the term of this patent is extended or adjusted under 35 U.S.C. 154(b) by 0 days.

(21) Appl. No.: 15/520,862

(22) PCT Filed: Oct. 23, 2015

(86) PCT No.: PCT/FI2015/050730
§ 371 (c)(1),
(2) Date: Apr. 21, 2017

(87) PCT Pub. No.: WO2016/062927
PCT Pub. Date: Apr. 28, 2016

(65) Prior Publication Data
US 2017/0336052 A1  Nov. 23, 2017

Related U.S. Application Data

(60) Provisional application No. 62/067,630, filed on Oct. 23, 2014.

(51) Int. Cl.
*F21V 5/08* (2006.01)
*G02B 5/18* (2006.01)
(Continued)

(52) U.S. Cl.
CPC ............... *F21V 5/08* (2013.01); *F21V 5/002* (2013.01); *F21V 5/048* (2013.01); *G02B 3/08* (2013.01);
(Continued)

(58) Field of Classification Search
CPC . F21V 5/048; F21V 5/002; F21V 5/04; F21V 5/08; F21V 5/046; F21V 5/045;
(Continued)

(56) References Cited

U.S. PATENT DOCUMENTS 1,794,839 A    3/1931  Dorey
5,138,495 A *  8/1992  Shiono ................. G02B 3/08
                                              250/201.6
(Continued)

FOREIGN PATENT DOCUMENTS

EP    0738904 A1   10/1996
EP    2743740 A1   6/2017
(Continued)

OTHER PUBLICATIONS

European Patent Office, Supplementary European Search Report dated Mar. 18, 2018 in EP patent application No. 15851959.5.
(Continued)

*Primary Examiner* — Bao Q Truong
(74) *Attorney, Agent, or Firm* — Berggren LLP

(57) ABSTRACT

A lighting apparatus comprising a single point-like light source, preferably a LED, and a transmissive lens structure optically connected to said light source defining a plurality of optically functional, mutually different segments dedicated for controlling the light, e.g. distribution and direction, originally emitted by said single light source. A corresponding transmissive element is presented.

9 Claims, 5 Drawing Sheets

(51) Int. Cl.
  *G02B 27/42* (2006.01)
  *G02B 3/08* (2006.01)
  *G02B 19/00* (2006.01)
  *F21V 5/00* (2018.01)
  *F21V 5/04* (2006.01)
  *F21Y 115/10* (2016.01)

(52) U.S. Cl.
  CPC ....... *G02B 5/1819* (2013.01); *G02B 19/0004* (2013.01); *G02B 19/0061* (2013.01); *G02B 27/425* (2013.01); *F21Y 2115/10* (2016.08)

(58) Field of Classification Search
  CPC ........... F21V 5/00; G02B 3/08; G02B 5/1819; G02B 19/0004; G02B 19/0061; G02B 27/425; G02B 27/42; G02B 5/18; F21Y 2115/10
  See application file for complete search history.

(56) References Cited

U.S. PATENT DOCUMENTS

| | | | |
|---|---|---|---|
| 2004/0105171 A1* | 6/2004 | Minano | G02B 3/08 359/728 |
| 2010/0195330 A1 | 8/2010 | Schaefer et al. | |
| 2010/0254013 A1* | 10/2010 | Huang | G02B 3/08 359/599 |
| 2011/0141734 A1 | 6/2011 | Li et al. | |
| 2012/0106166 A1 | 5/2012 | Chang | |
| 2013/0176727 A1* | 7/2013 | Desmet | G02B 6/0073 362/241 |
| 2014/0204592 A1* | 7/2014 | Miyashita | G02B 5/188 362/311.06 |
| 2014/0268811 A1 | 9/2014 | Chen | |
| 2015/0003081 A1* | 1/2015 | Kobayashi | G02B 3/08 362/311.02 |
| 2016/0018077 A1* | 1/2016 | Mallory | F21V 5/007 362/311.02 |

FOREIGN PATENT DOCUMENTS

| | | |
|---|---|---|
| JP | S58165204 A | 9/1983 |
| WO | 2013108509 A1 | 7/2013 |

OTHER PUBLICATIONS

European Patent Office, Communication pursuant to Article 94(3) EPC issued in European patent application No. 15851959.5 dated Nov. 21, 2018.

* cited by examiner

PRIOR ART

FIG. 3B

LENS HAVING MUTUALLY DIFFERENT OPTICAL SEGMENTS

PRIORITY

This application is a U.S national application of the international application number PCT/FI2015/050730 filed on Oct. 23, 2015 and claiming priority of US provisional application number U.S. 62/067,630 filed on Oct. 23, 2014, the contents of all of which are incorporated herein by reference.

FIELD OF THE INVENTION

The present invention generally relates to illumination and lighting. Especially, however not exclusively, the invention pertains to a lighting apparatus incorporating a light source and a lens structure.

BACKGROUND

Traditionally lenses for light sources such as bulbs, LEDs (light emitting diode), etc. have been designed as simple, symmetrical elements of suitable material such as plastics or glass. FIG. 1 depicts a typical lens associated with a point-like light source such as a LED 108 from different angles. From the axonometric view 102 and top view 104 the uniformity of a contemporary lens structure can be easily investigated. Further with reference to a side view 106, such flat (the shown case), concave, or convex lens contains even surface or at most, it may incorporate a constant optically functional pattern such as a grating. Such solutions have been relatively straightforward to develop and fabricate while still functioning relatively well in terms of light transmission, coarse refraction and light source protection objectives, but from the standpoint of arisen contemporary requirements set for illumination what comes the energy efficiency, light pattern controllability, light fixture size, etc., these simple conventional lenses have clearly become sub-optimum and new solutions are required. The optics has seemingly lagged behind the development of the actual light sources such as LEDs and their various further forms.

SUMMARY

An object of the present invention is to at least alleviate one or more of the aforesaid problems relating to the prior art.

The objective of the present invention can be achieved by the features of independent claims.

In one aspect, the invention relates to a lighting apparatus in accordance with independent claim 1. In another aspect, it relates to an optically transmissive element of claim 10.

According to one embodiment of the invention a lighting apparatus comprises a single preferably point-like light source, most preferably a LED, and a transmissive lens structure optically connected to said light source defining a plurality of optically functional mutually different segments dedicated to said single light source for controlling the light distributed and directed therefrom.

According to one other embodiment, an optically transmissive element for at least optically connecting to preferably single point-like light source to form a lighting apparatus therewith, defines a plurality of optically functional, mutually different segments (204, 206, 208, 304, 306, 308) dedicated for jointly controlling the light distributed and directed from said preferably single light source.

The apparatus may establish at least part of a lighting device package, e.g. a LED package. The light source and lens structure may be integrated together directly and/or via intermediate elements (support, body, etc.) of the package. The light source may include e.g. a LED chip, or 'die'. The lens may be located at a distance from the actual LED chip. Alternatively, it may at least partially encapsulate the LED die and optionally further elements such as a related substrate, wiring, pads, control/driver electronics, etc. The lens material may in some embodiments substantially contact the LED chip or be separated therefrom by a gap of intermediate material that may be gaseous, fluidic, fluid, solid, or gel.

The lens may be substantially planar or 'flat'. Alternatively, it may bear true 3D shape as well potentially having asymmetric shape(s). The lens may comprise one or more materials, e.g. plastic, silicone, or glass. It may be monolithic.

The segments may be different in terms of structural features. They may have mutually different volumes and/or surface areas in terms of size, shape and related optically functional features such as patterns, optionally surface relief patterns, isolated forms/profiles, and/or cavity optics. The actual optical functions between the segments may vary as well. Multiple segments may be internally and/or mutually symmetric relative to a common reference, or be asymmetric. The segments may be mutually adjacent, overlapping and/or contain nested portions.

The lens structure may further contain a number of segments free of surface relief forms.

The patterns of different segments may contain mutually different relief forms, alignment of forms, scale/dimensions of forms, and/or density or period of forms.

The relief forms may define single profiles, connected profiles, combined, overlapping or hybrid profiles, nested profiles, grooves, protrusions, slanted profiles, rectangular profiles, blazed profiles, blazed grating profiles, refractive Fresnel profiles, diffractive grating profiles, symmetric profiles, asymmetric profiles, and/or refractive profiles.

In addition to or instead of surface features, a number of optical features may be embedded in the segments. The embedded optical features include e.g. particles, patterns and cavities such as air or other gaseous, fluidic, gel, or solid cavities of different material/substance than the neighbouring solid matter of the lens. The boundary of a cavity and (solid) neighbouring lens material may define internal relief forms within the lens structure.

The lens structure may define a single layer lens or a multi-layer lens from a single or multiple pieces of material optionally joined together. Physically, a number of different layers may be first designed and provided with different optical features and then joined together by suitable methods such as lamination. Alternatively, a functional multi-layer structure may be established by processing already integral or even monolithic piece of material at different depths to obtain the desired layers.

A segment and/or a related feature such as a surface pattern, surface form, or an embedded feature may be configured to implement at least one function selected from the group consisting of: light management, directing, collimation, diffusing, diffracting, coloring (e.g. from white light) and scattering.

The size of the afore-discussed features may be in the order of magnitude of sub-microns, or one or several microns depending on the embodiment, for example.

The desired minimum transmittance of the lens depends on the embodiment and may be at least about 50%, 60%, 70%, 80%, 85%, 90%, or even 95% having regard to the target wavelengths. Yet, the lens may be optically transparent (transmittance e.g. in the order of magnitude of 90% or higher) or translucent with considerable light scattering properties. The lens may be colored or have a coloring function. The light source may emit white light and/or light of another color/wavelength, e.g. infrared light. Thus visible and/or invisible light emitting source may be used.

The utility of the present invention arises from a variety of factors depending on each particular embodiment thereof. Optical design is increasingly important in the field of lighting. The present solution addresses that global need in a novel manner. Even light outcoupled from a single point-like light source such as LED may be accurately and thoroughly controlled by an embodiment of the present invention. The novel lens design may contain many different segments defining discrete areas having different optical features for light management, light directing or directivity enhancing, collimating, and diffusing purposes among other options. This single light source based solution enables to provide asymmetric and generally preferred light distribution for illumination. Uniformity of distributed light may be controlled. A large uniform distribution may be constructed by a multi-LED solution comprising a plurality of the suggested lighting apparatuses, each having its own dedicated/individual (mutually even unique) lens structure in order to control the distributed light properly. The apparatuses of the multi-LED solution may be jointly controlled by applicable control electronics.

Various other advantages will become clear to a skilled person based on the following detailed description.

The expression "a number of" refers herein to any positive integer starting from one (1), e.g. to one, two, or three.

The expression "a plurality of" refers herein to any positive integer starting from two (2), e.g. to two, three, or four.

The terms "first" and "second" do not denote any order, quantity, or importance, but rather are used to distinguish one element from another.

Different embodiments of the present invention are disclosed in the dependent claims.

BRIEF DESCRIPTION OF THE DRAWINGS

Next the invention will be described in greater detail with reference to the accompanying drawings, in which:

FIG. 3B depicts surface design options, related parameters and shapes for the embodiment of FIG. 3A.

DETAILED DESCRIPTION

The suggested optically transmissive element, e.g. a lens, may generally be substantially planar, e.g. of a planar/low-height cylindrical shape. Further, it may be curved or contain curved shapes. It may define a substantially circular surface area on one or two, potentially opposing, sides thereof. At least it may have a circular cross-section. Alternatively, other shapes may be utilized, e.g. angular such as rectangular, triangular, hexagonal or generally polygonal shapes regarding the cross-section and/or the surface(s).

A segment may define a discrete (functionally, structurally and/or visually distinguishable) half circle area (or have a half circle projection) on the lens surface. Alternatively, a segment may define a quarter circle or area of some other shape with e.g. (straight) line and/or curve type boundary with a neighbouring segment or the environment. A segment is adjacent to at least one other segment of the lens.

The lens is designed for serving a single point-like light source such as LED, but many LED+lens combinations can be conveniently brought together to generate a larger illumination fixture preferably having common housing.

Figure 1:
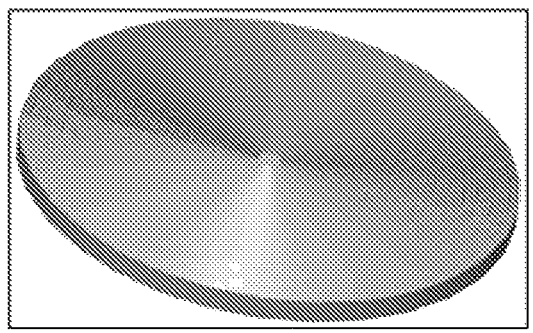
FIG. 1 illustrates an embodiment of a lighting arrangement in accordance with prior art.
Figure 1:
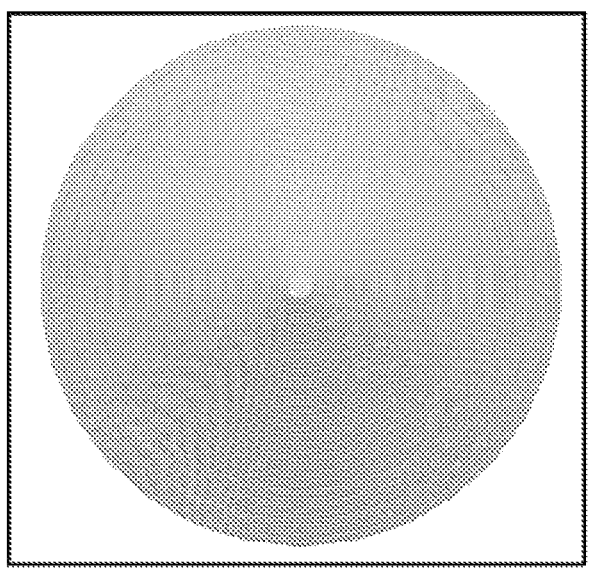
Figure 1:
Figure 1:
Figure 2A:
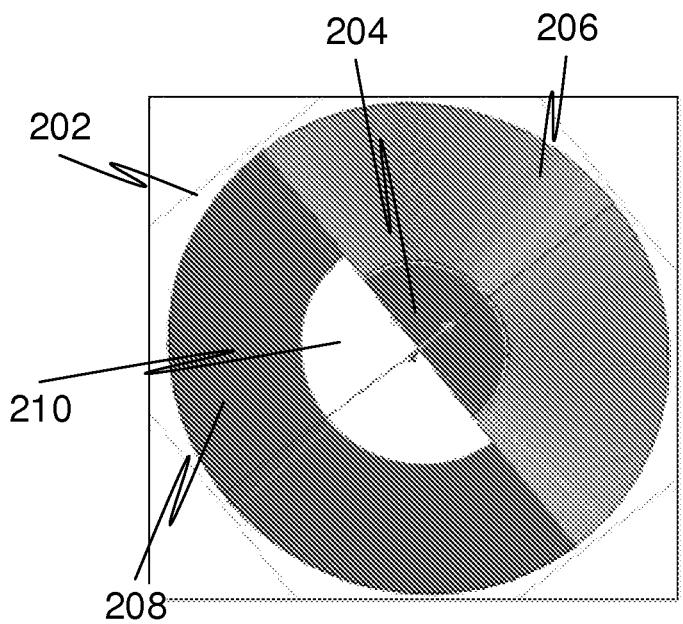
FIG. 2A illustrates an embodiment of a lighting apparatus in accordance with the embodiment of the present invention.

FIG. 2A illustrates, via a top/plan view, an embodiment of a lighting apparatus in accordance with the embodiment of the present invention. Especially the transmissive element (lens) 202 is shown in the figure. Light source itself, typically only a single LED, is now shown in the figure as it does not, as such, form the inventive core of this embodiment, but e.g. the sketch 106 of FIG. 1 incorporating LED 108 is applicable also here what comes the coarse positioning of the light source relative to the lens 202, i.e. the lens is at least optically connected to the LED so that the light emitted therefrom is incident on the lens 202, propagates through the lens 202 and is finally emitted or 'outcoupled' therefrom with desired properties regarding e.g. distribution, direction, collimation, diffusion, etc. The lens 202 is thus configured for controlling the light (e.g. distribution and direction) originally emitted by the single light source.

At this point, it is generally noteworthy to mention that the lens structures in accordance with embodiments of the present invention may optionally contain functional coating(s) and/or film(s), the function of which may be optical, protective, anti-scratch, moisture repelling (hydrophobic), etc.

Reverting to FIG. 2A, the embodiment comprises three segments 204, 206, 208 for light management. In this example, each segment generally or roughly defines a half circle area, each area having a different period and profile of grating grooves thereon. The surface (relief) patterns of the segments 204, 206, 208 may be considered to form an overall or aggregate surface pattern of the whole lens surface.

Within the area of the segment the period and pattern/profile of the relief forms remain unchanged. For instance, the provided grooves may be few microns, e.g. about 9 μm deep, and may rotate around the origin thus following the general form of the segment. Diameter of the overall component may be about 70 mm.

Figure 2B:
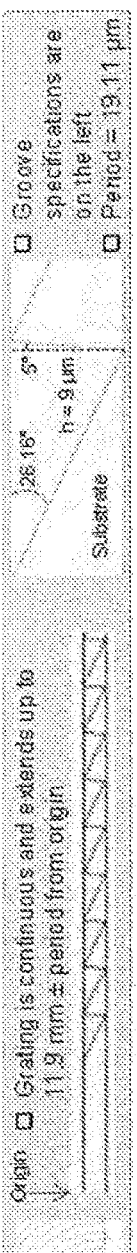
FIG. 2B depicts surface design options, related parameters and shapes for the embodiment of FIG. 2A.
Figure 2B:
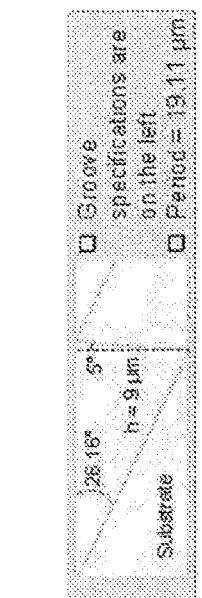
Figure 2B:
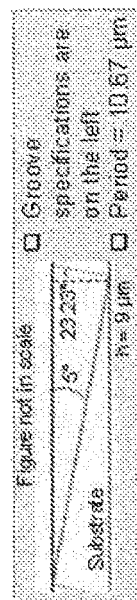
Figure 2B:
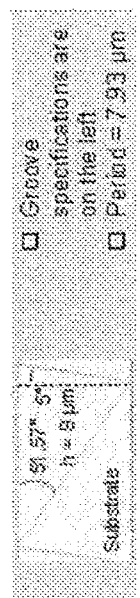
Figure 2B:
Figure 2B:

FIG. 2B depicts surface design options, related parameters and shapes for the areas 1, 2 and 3 of the respective segments 204, 206, 208 of the embodiment of FIG. 2A. Groove periods range from about 8 microns to about 20 microns. Gratings within the areas are continuous.

Area 1 of segment 204 starts from the origin (e.g. centre of lens surface) whereas areas 2 and 3 of segments 206, and 208 do not as they begin further away therefrom. The lens 202 may have an empty area 210 free of optically functional features between the segments 208 and 206, 204.

Alternatively, the numeral 210 may refer to a dent, cavity or even a through-hole in the lens structure 202.

Figure 3A:
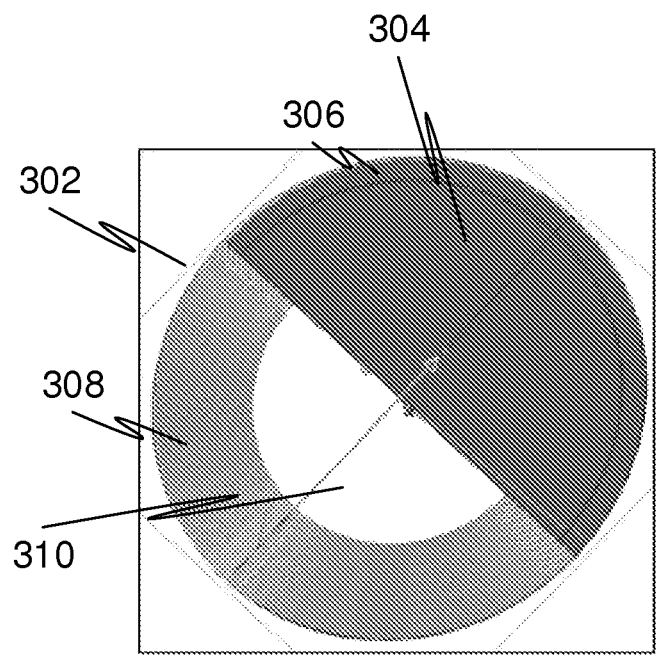
FIG. 3A illustrates another embodiment of a lighting apparatus in accordance with the present invention.

FIG. 3A illustrates, via a top/plan view, another embodiment of a lighting apparatus in accordance with the present invention. Transmissive element (lens) 302 is shown in the figure.

The embodiment comprises three segments 304, 306, 308 for light management. The surface (relief) patterns of the segments 304, 306, 308 may be considered to form an overall or aggregate surface pattern on the lens surface. Generally the grooves may be similar to the ones of FIG. 2A.

Figure 3B:
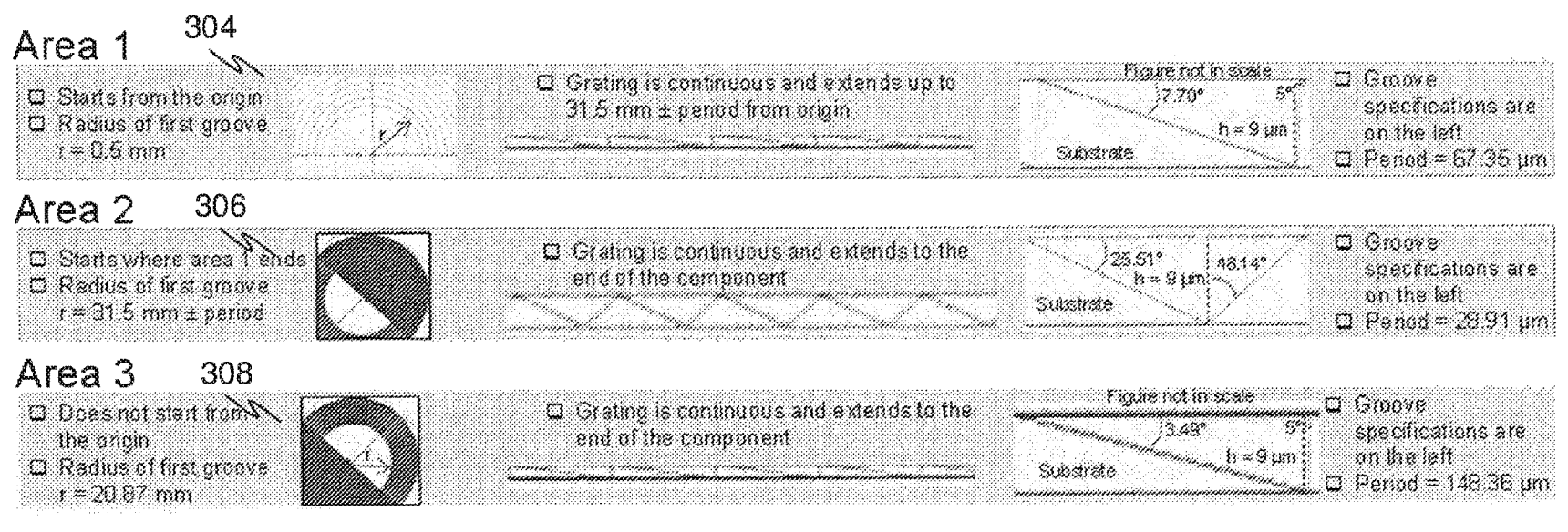

FIG. 3B depicts surface design options, related parameters and shapes for the areas 1, 2 and 3 of the respective segments 304, 306, 308 the embodiment of FIG. 3A. Groove periods range from about 29 microns to about 67 microns. Gratings within the areas are continuous.

Area 1 of segment 304 starts from the origin (centre of lens surface) whereas areas 2 and 3 of segments 306, and 308 do not as they begin further away therefrom. The lens 302 may have an empty area 310 free of optically functional features between the segments 208 and 206, 204. Alternatively, the numeral 210 may refer to a dent, cavity or even a through-hole in the lens structure 202.

Figure 4:
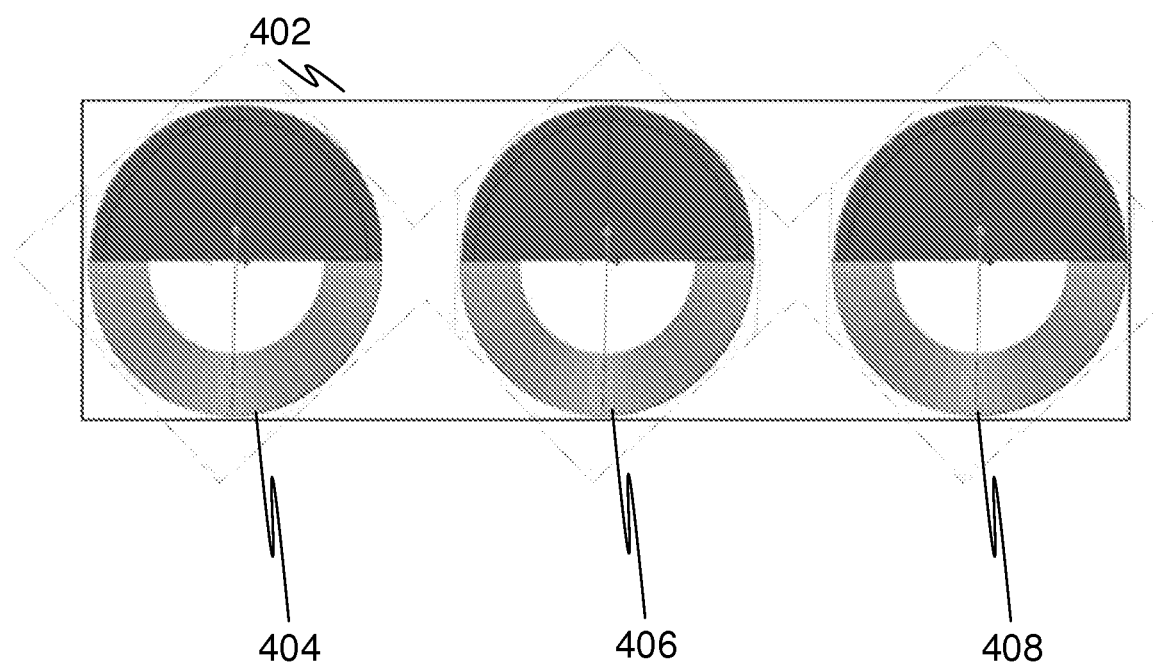
FIG. 4 depicts an embodiment of a multi-LED solution with multiple light sources, each allocated with a dedicated lens structure.

FIG. 4 depicts an embodiment of a multi-LED solution 402 with multiple lighting apparatuses described hereinbefore, potentially integrated within common housing, each apparatus comprising a dedicated light source allocated with a dedicated lens structure 404, 406, 408. The lenses may, as a whole, establish a lens matrix.

The invention claimed is:

1. A lighting apparatus comprising a single point light source and a flat transmissive lens structure for the single point light source having two opposing flat surfaces and being optically connected to said single point light source, wherein the lens structure comprises a plurality of optically functional, mutually different circular segments or circular sectors wherein each segment or sector is continuously arranged on the lens forming an asymmetric concentric structure having discrete areas and the lens is configured to produce an asymmetric light distribution from said single light source.

2. The apparatus of claim 1, wherein the mutually different circular segments or circular sectors are different in terms of at least one factor selected from the group consisting of: shape, size, volume, coating, amount, density, placement, and alignment of optically functional structural features.

3. The apparatus of claim 1, wherein at least one of the optically functional, mutually different circular segments or circular sectors comprises at least one optically functional feature selected from the group consisting of: surface relief form, surface relief pattern, surface relief grating, diffractive grating, diffractive profile, relief groove, relief protrusion, slanted relief profile, blazed relief profile, symmetric relief profile, asymmetric relief profile, refractive profile, and a number of refractive Fresnel profiles.

4. The apparatus of claim 1, wherein at least one of the optically functional, mutually different circular segments or circular sectors is configured for establishing at least one optical function selected from the group consisting of: light directivity management, diffusion, collimation, diffraction, coloring, scattering, and distribution control.

5. The apparatus of claim 1, wherein at least one of the optically functional, mutually different circular segments or circular sectors comprises a curved functional surface feature.

6. A luminaire unit comprising a plurality of apparatuses of claim 1.

7. An optically transmissive element for at least optically connecting to a single point light source to form a lighting apparatus therewith, wherein said optically transmissive element consists of a plurality of optically functional, mutually different continuously arranged circular segments or circular sectors forming an asymmetric concentric structure having discrete areas and being configured for jointly controlling the light distributed and directed from said single point light source, wherein the optically transmissive element includes a flat transmissive lens structure for the single point light source having two opposing flat surfaces and the lens is configured to produce an asymmetric light distribution from the single point light source.

8. The apparatus of claim 1, wherein the single point light source is a light emitting diode (LED).

9. The apparatus of claim 5, wherein the curved functional surface feature is a circular feature.

* * * * *